D. A. THOMAS.
COMBINED CIGAR TIP CUTTER AND LIGHTER.
APPLICATION FILED MAR. 21, 1910.
1,021,080.
Patented Mar. 26, 1912.
3 SHEETS—SHEET 2.
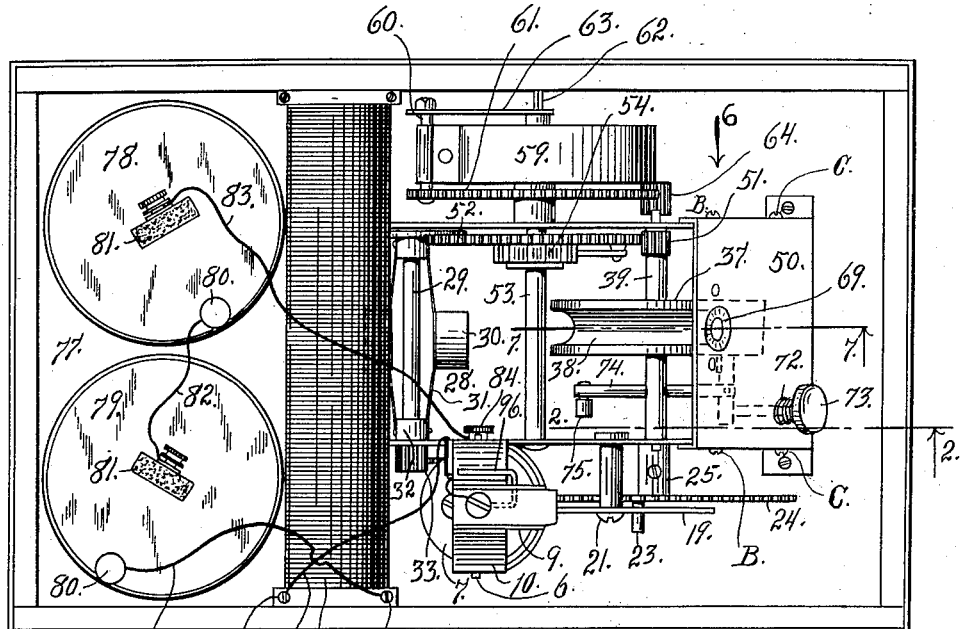
Fig. 5.
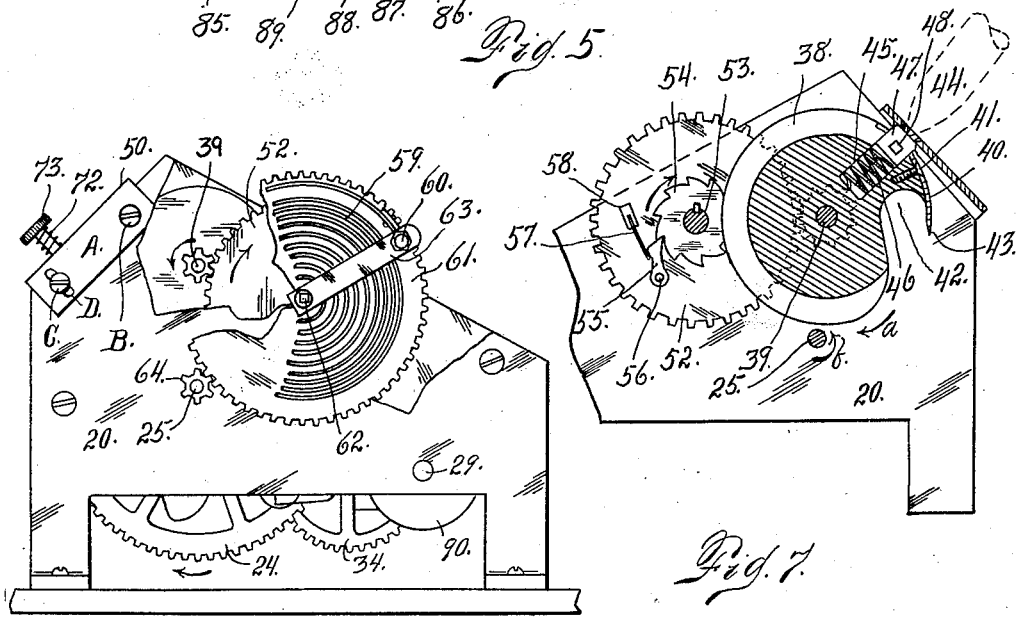
Fig. 6.
Fig. 7.
Witnesses
Otto E. Hoddick
C. H. Rossner
Inventor
David A. Thomas
By C. A. O'Brien
Attorney D. A. THOMAS.
COMBINED CIGAR TIP CUTTER AND LIGHTER.
APPLICATION FILED MAR. 21, 1910.

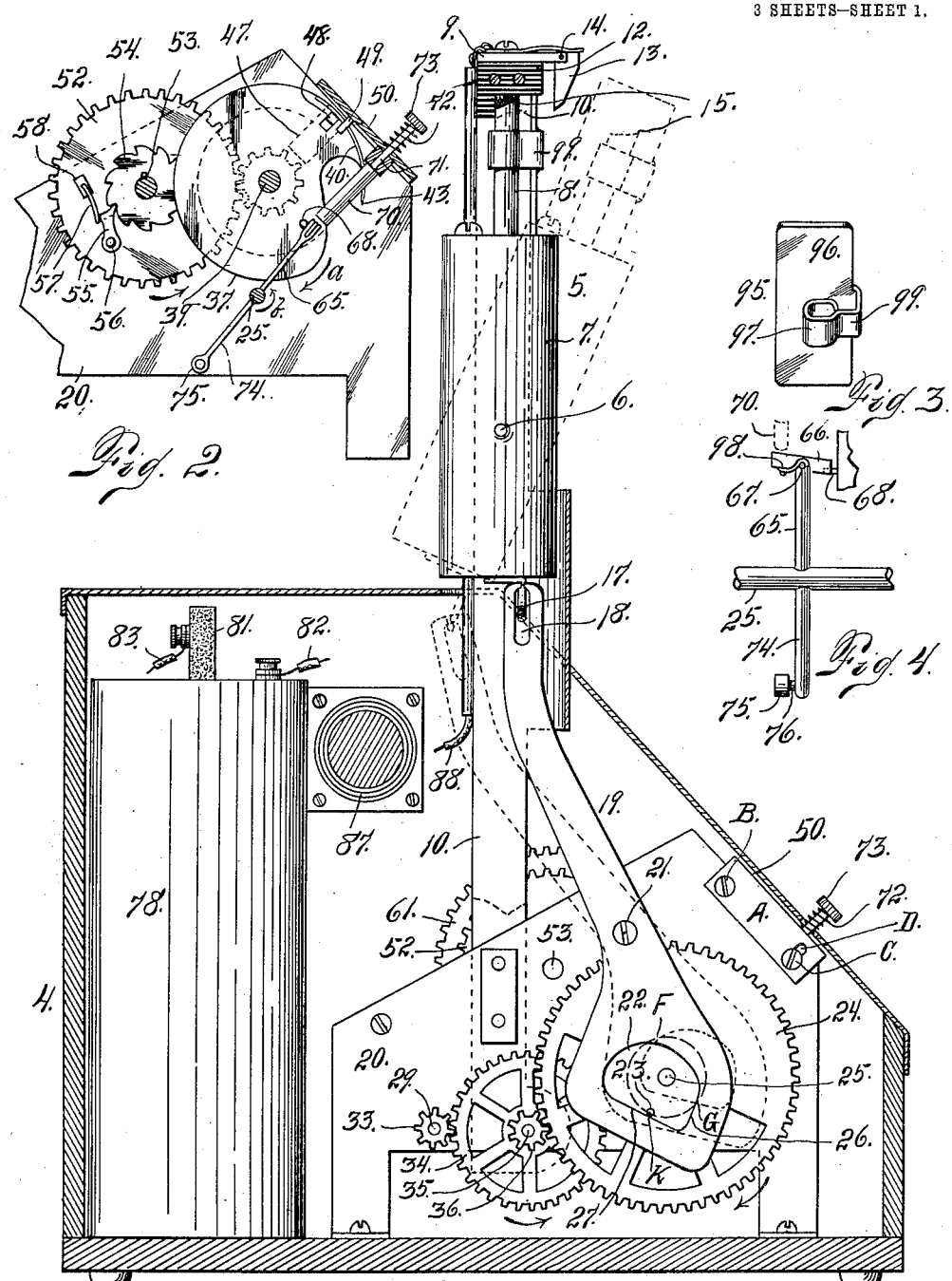

1,021,080.

Patented Mar. 26, 1912.

3 SHEETS—SHEET 3.

Witnesses
Otto E. Hoddick.
C. H. Roessner.

Inventor
David A. Thomas.
By C. A. O'Brien.
Attorney

UNITED STATES PATENT OFFICE.

DAVID A. THOMAS, OF DENVER, COLORADO.

COMBINED CIGAR TIP-CUTTER AND LIGHTER.

1,021,080.  Specification of Letters Patent.  Patented Mar. 26, 1912.

Application filed March 21, 1910. Serial No. 550,775.

*To all whom it may concern:*

Be it known that I, DAVID A. THOMAS, a citizen of the United States, residing in the city and county of Denver and State of Colorado, have invented certain new and useful Improvements in Combined Cigar Tip-Cutters and Lighters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 8:
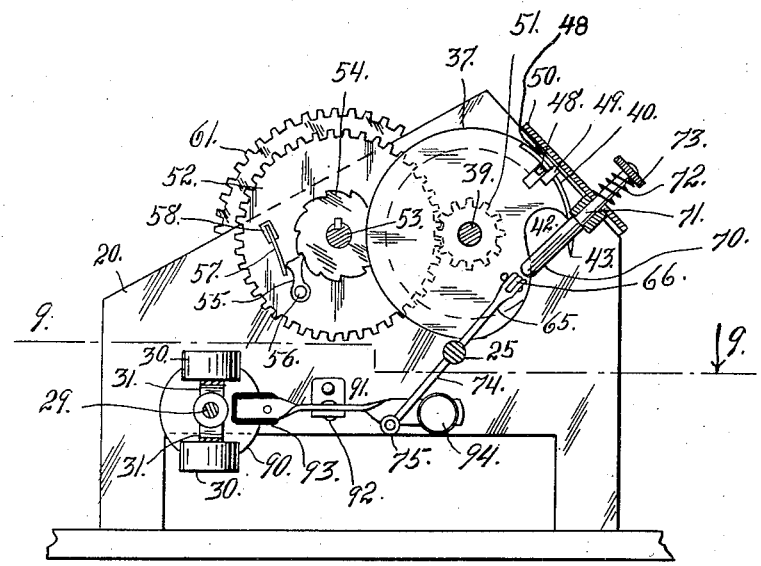
Figure 9:
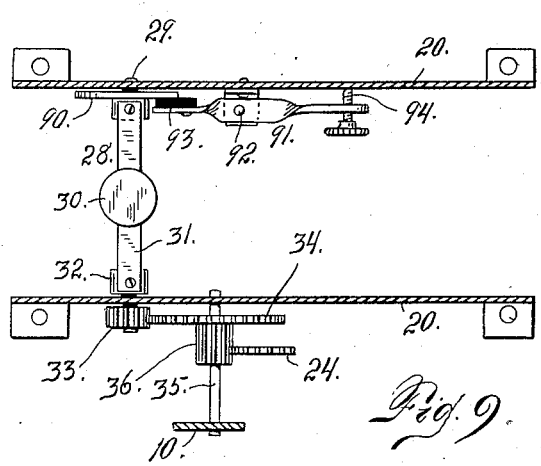

My invention relates to improvements in cigar-tip cutters and lighters of the class set forth in Letters Patent No. 711,171, dated October 14th, 1902, my object being to simplify and improve the said construction by the addition of certain novel features of construction, all of which will be fully understood by reference to the accompanying drawing, in which:

Figure 1 is a side elevation of the mechanism, the casing being shown in section. Fig. 2 is a vertical section taken on the line 2—2, Fig. 5. Fig. 3 is a detail view of a reversible wind-shield employed to protect the torch from the influence of a wind or draft of air. Fig. 4 is a fragmentary detail elevation of a part of the mechanism. Fig. 5 is a top plan view of the construction, with the top of the casing removed. Fig. 6 is a fragmentary elevation looking in the direction of arrow 6, Fig. 5. Fig. 7 is a vertical section taken on the line 7—7, Fig. 5. Fig. 8 is a section taken through the mechanism for the purpose of illustrating the retarding device, namely a rotary governer and an adjustable brake lever coöperating therewith. Fig. 9 is a section taken on the line 9—9, Fig. 8, looking downwardly.

The same reference characters indicate the same parts in all the views.

Let the numeral 5 designate the torch which is pivotally mounted on trunnions near its vertical center as shown at 6, whereby it is adapted to assume the dotted line position in Fig. 2 or the vertical position, as may be desired. This torch comprises a receptacle 7 for alcohol or other substance with which is connected a tube 8 provided with a wick, thereby constituting a sort of lamp. The torch is equipped at its top with a sort of cap 9 which is insulated from the frame 10 as shown at 12. This cap carries a depending electrode 13 pivotally connected with the cap as shown at 14. The upper extremity of the lamp tube 8 also carries an electrode 15 which coöperates with the electrode 13 to produce a spark, during the movement of the torch from the full line position in Fig. 1 to the dotted line position, the said spark serving to ignite the combustible and volatile fluid carried by the wick, the torch remaining lighted long enough to light a cigar, but is then returned to its upright position, the fire or blaze of the wick being extinguished by a member 16 against which the top of the tube 8 fits closely.

My improvements relate more particularly to the torch operating mechanism which is normally locked, the cigar-cutting mechanism, and means for simultaneously releasing the torch-operating mechanism when the cigar cutter is not employed.

The lower extremity of the torch is provided with a sort of crank pin 17 which engages a slot 18 formed in the upper extremity of a lever 19 fulcrumed on the frame 20 as shown at 21. The lower extremity of this lever is provided with a cam-shaped slot or opening 22 and the edge of the lever around this opening is engaged by a pin 23 secured to a gear wheel 24, the latter being fast on a horizontally disposed spindle 25 journaled in the opposite sides of the frame 20. The shape of the slot 22 is such that during a complete rotation of the wheel 24, the torch will be thrown from the vertical position shown by full lines in Fig. 1 to the tilted position shown by dotted lines in the same figure. The gear 24 travels in the direction indicated by the arrow adjacent thereto (see Fig. 1), and as soon as the pin 23 reaches the point F, and while traveling from the point F to the point G, the lever 19 is actuated to throw it as well as the torch into the dotted line position. While the torch is traveling past the electrode 13, a spark is produced which lights the torch, the torch remaining lighted until it has returned to the vertical position; while the pin is traveling from the point F to the point G, the torch remains practically in its tilted position, and while the torch is in this position, the lever 19 is also in a tilted position, and the side 27 of the slot now occupies a position in the path of the pin 23, whereby when the pin 23 begins to leave the point G, the side 27 is engaged by and remains in engagement therewith until the said pin leaves a point K in the side 27 of the slot. Thus, while the pin is traveling from the point G to the point K, the lever is being actuated to return the torch to its vertical position, where the light will be extinguished. It will thus be seen that the shape of the cam slot or opening 22 is such as to leave the torch lighted during the greater portion of the time required for the actuating gear 24 to make a complete revolution.

In order to regulate the travel of the gear 24 and prevent too rapid action of the torch, a governor 28 is employed which consists of a spindle 29 carrying weights 30 mounted on springs 31 whose extremities are connected with hubs 32 on the spindle. This spindle is provided at one extremity with a pinion 33 engaging a relatively large gear 34 fast on a spindle 35, the latter carrying also a pinion 36 meshing with the large gear 24.

The cigar-cutter consists of a wheel 37 whose periphery is grooved as shown at 38, the wheel being mounted on a spindle 39 journaled in the sides of the frame 20. This wheel is provided at one part of its periphery with a knife 40 which is secured thereto by a screw 41. The wheel is recessed as shown at 42 and the edge 43 of the knife blade is located adjacent this recess which makes room for the entrance of the tip of a cigar 44 during the cutting operation. The portion of the cutter wheel where the knife is located, is recessed as shown at 45 to receive a spiral spring 46 which acts upon a plug 47 carrying lugs 48 normally occupying a position in the path of corresponding lugs 49 formed on the plate 50 of the frame. The spindle 39 of this wheel carries a pinion 51 which meshes with a relatively large gear 52 loose on a spindle 53 journaled in the side plates of the frame 20. Fast upon this spindle is a ratchet-wheel 54 engaged by a pawl 55 pivoted on the gear 52 as shown at 56. This pawl is held in engagement with the toothed periphery of the ratchet-wheel by a leaf-spring 57 secured to the gear 52 as shown at 58.

Secured to one extremity of the spindle 53 outside of the frame 20 is one extremity of a clock-spring 59 whose opposite extremity is secured to a pin 60 made fast to a gear 61 loose on the spindle 53. In order to support the outer extremity of the pin 60, it is connected with the outer extremity 62 of the spindle 53 by a plate 63. The extremity 62 of the spindle 53 protrudes beyond the plate 63 and is formed angular in cross section, perferably square, to fit the counterpart socket of a key, not shown, for winding the spring. During the operation of winding the spring the spindle 53, together with the ratchet-wheel 54, is rotated in the direction of the arrow located adjacent the ratchet-wheel in Fig. 7. In this event the pawl 55 slips from the teeth of the ratchet while the gear 52 remains stationary. After the spring is wound, it is evident that it will have a tendency to rotate the spindle 53 in a direction opposite the movement of the latter while winding the spring; and since the opposite extremity of the spring or its outer end is secured to the pin 60 mounted on the gear-wheel 61 which is loose on the spindle 53, the spring will have a tendency to rotate the gear 61 in the direction of the rotation of the spindle while winding the spring or in a direction opposite the rotation of the gear 52 which is actuated from the inner extremity of the spring as aforesaid.

The extremity of the spindle 25, carrying the gear 24, is provided at its extremity remote from the last named gear, with a pinion 64 which meshes with the relatively large gear 61. Provision must be made for locking the spindle 25 against rotation, otherwise the spindle would rotate under the influence of the spring 59 until the powers stored in the latter were exhausted. This is also true with reference to the spindle 39 upon which the cutter wheel 37 is mounted. From what has already been said it will be understood that the tendency of the spring 59 is to rotate the two spindles 25 and 39 in opposite directions. In other words, the cutter wheel 37 has a tendency under the influence of the inner extremity of the spring 59, acting through the ratchet 54, the gear 52 and the pinion 51, to rotate in the direction of the arrow $a$ in Fig. 7; while the tendency of the spindle 39, and the gear 24, acting through the gear 61 and the pinion 64, is to rotate in the direction of the arrow $b$ (see Fig. 7).

Fast on the spindle 25 is an arm 65 carrying a short lever 66 at its outer extremity. This lever is arranged to rock on a pivot 67 and is normally supported by a spring 98 which engages one extremity, so that its opposite extremity shall lie in the path of a small pin 68 fast on the cutter wheel. The latter is normally locked against movement by the engagement of the lugs 48 carried by the cutter wheel, with the lugs 49 stationary on the frame plate 50, as heretofore explained.

If it is desired to cut off the tip of a cigar before lighting the same, the pointed end of the cigar will be inserted in an opening 69 formed in the frame plate 50, and pressed against the plug 47, until the latter is forced inwardly far enough to disengage its lugs 48 from the lugs 49 on the plate 50. As soon as this occurs, the cutter-wheel will rotate in the direction of the arrow $a$, making one complete revolution, and just before this revolution is completed, the edge 43 of the knife will pass the opening 69 of the plate 50 and cut off the tip of the cigar. It must be understood that the spring-actuated plug or plunger 47 is located at one end of the groove 38 in the cutter wheel, so that when the plug 47 is depressed to disengage its lugs from the lugs 49 on the plate 50, the wheel will be free to move, the groove 38 forming a space for the pointed end of the cigar until the knife severs the same.

It will be understood that every time the cutter wheel makes a complete rotation, the stop pin 68 moves away from the short lever 66, thus releasing the arm 65 of the spindle 25 and allowing the latter, together with the gear wheel 24 to make one complete revolution in the direction indicated by arrow b, and during this rotary movement of the spindle 25 the gear 24 is also actuated and the pin 23 located beyond the center of the gear 24, moving in the cam-opening 22 of the lever 19, actuates the latter to throw the torch first from the vertical position shown in Fig. 1 to the tilted position shown in the same figure, and back again to the vertical position. As the torch moves from the vertical position to the tilted position, the electrode 15 at the upper end of the torch-tube, engages and passes the pivoted electrode 30, during which time an igniting spark is produced through the instrumentality of an electrical circuit, hereinafter described, and as the torch returns to the vertical position the flame at the end of the tube is extinguished by the device 16. When, however, it is desired to light the torch without cutting the tip of the cigar or without operating the cutter, a plunger 70 is actuated to depress the spring-held end of the short lever 66, sufficiently to disengage the opposite end of the said lever from the pin 68 of the cutter wheel. As soon as this occurs, the arm 65 is released and the spindle 25, together with the gear 24 is allowed to make one complete rotation whereby the torch is operated, as heretofore explained. This plunger 70 is provided with a reduced portion 71 which passes through the plate 50 and is surrounded by a coil spring 72 outside of the plate and engaging a head or button 73, which is exposed outside of the plate 50 for convenience of the operator. It will therefore be understood, that in order to release the mechanism for operating the torch without releasing the cutter wheel, it is only necessary to push the button 73, whereby the plunger 70 is forced inwardly a sufficient distance to operate the short lever 66 and release the arm 65 from the stop-pin 68 of the cutter wheel.

In order to make it practicable to lock the torch in the lighted position by continuous pressure on the button 73, the spindle 25 is equipped with a second arm 74 projecting therefrom diametrically opposite and in alinement with the arm 65, whereby as soon as the shaft 25 and the wheel 24 have completed one-half a revolution and thrown the torch to the lighted position, a roller 75 mounted on a pin 76, projecting from one side of the outer extremity of the arm 74 will engage the actuating plunger 70 and hold the torch outwardly in the lighted position as long as the user cares to press inwardly upon the button 73.

In order to supply the lighter with the necessary electrical current for producing the igniting spark, a battery 77 may be located in the casing 4 in the rear of the operating mechanism. As shown in the drawing, this battery is composed of two cells 78 and 79, the opposite poles 80 and 81 of which are connected by a conductor 82. From the pole 81 of the cell 78 a conductor 83 leads to a binding-post 84 connected with the metal framework of the machine, with which the metal torch is in direct contact and thereby placing the electrode 15 at the top of the tube 8 in the circuit. From the pole 80 of the cell 79, a conductor 85 leads to a terminal 86 of a spark coil 87; while a conductor 88 leads from the opposite terminal 89 of the spark coil to the metal cap 9, thus placing the depending electrode 12 in the opposite branch of the circuit. From this it will be evident, that as the electrode 15 of the torch forms a wiping-contact with the electrode 12 and passes the same, an igniting spark will be produced for the purpose heretofore explained.

The governor spindle 29 is provided at one extremity with a friction-disk 90 fast on the spindle and adapted to be engaged by an extremity 93 of a lever 91 centrally fulcrumed as shown at 92, and whose opposite extremity is provided with a threaded opening engaged by an adjusting screw 94. By turning this screw in one direction, it is evident that the extremity 93 is thrown away from the friction disk 90; while when the screw is turned in the opposite direction, the extremity 93 of the lever is forced against the said friction-disk, and the movement of the governor and the parts connected therewith, correspondingly retarded.

The wind-shield 95 consists of a plate 96 having a sleeve 97, connected about midway of the plate by an offset arm 99. This sleeve is adapted to fit the tube 8 of the torch, and occupy a position upon either side thereof according to the direction of the wind; and it is adapted for use to protect the blaze of the torch from the wind or drafts of air which would have a tendency to make the blaze unsteady and interfere with its proper use for cigar lighting purposes. Since the arm is connected with the plate or shield proper, midway of the vertical length of the latter, and the sleeve is located in a central position but offset from the plate, it is evident that the shield may be changed from one side to the other of the torch by simply reversing its extremities. For instance if one extremity is uppermost, when the shield is on one side of the torch, the opposite extremity will be uppermost when the shield is on the opposite side of the torch.

The plate 50 which is attached to the frame 20 and contains the opening 69 through which the cigar tip is inserted, in order to release the cutter and allow the latter to perform the tip-cutting function, is provided with depending flanges A through which fastening screws B and C are passed for the purpose of connecting the plate to the frame. It is desirable that this plate shall be adjustable in order that the portion thereof containing the cigar tip opening 69, shall be brought into suitable proximity with the knife of the cutter, to enable the latter to properly perform the cutting or shearing function. In order to provide for this adjustability, I form a slot D in each flange through which the screw C passes, and when it is desired to adjust the plate, I loosen the screws C on opposite sides and move the plate on the sleeves B which constitute pivots. It probably will be necessary to loosen the screws B in order to properly adjust the plate.

Having thus described my invention, what I claim is:

1. A cigar lighter, comprising a torch mounted to oscillate for lighting and extinguishing purposes, an operating lever connected in jointed relation with the torch for operating purposes, the said lever having a cam-opening, a rotatable wheel having a pin located beyond the center of the wheel and passing through the said opening of the slot, whereby the lever is actuated by the movement of the wheel, a motor connected in operative relation with the said wheel, means for normally locking the wheel against rotation in response to the stress of the motor, and means for releasing the said wheel to allow the latter to rotate for torch-operating purposes, substantially as described.

2. A cigar lighter, comprising a torch mounted to oscillate for lighting and extinguishing purposes, a lever connected in jointed relation with the torch for operating purposes and having a cam-opening, a rotatable wheel having a pin passing through the opening of the slot and arranged to operate the lever to actuate the torch as the wheel rotates, a spring, a spindle with which one extremity of the spring is connected, a gear loose on the spindle, and an operative connection between the said gear and the rotatable wheel, means for normally locking the wheel against movement, and means for releasing the said wheel to permit the latter to rotate for torch-operating purposes, substantially as described.

3. A cigar lighter, comprising a torch mounted to oscillate for lighting and extinguishing purposes, an operating lever connected with the torch for operating purposes, said lever having a cam opening, a rotatable wheel having a pin secured to the wheel at a distance from the center of the wheel and passing through the said opening, whereby the lever is actuated by the movement of the wheel, and means for actuating the said wheel, for the purpose set forth.

4. A cigar lighter, comprising a torch mounted to oscillate for lighting and extinguishing purposes, an operating lever connected in jointed relation with the torch for operating purposes, said lever having a cam, a rotatable wheel having means engaging the said cam, whereby the lever is actuated by the movement of the wheel, and means for operating the said wheel, for the purpose set forth.

5. A cigar lighter, consisting of a torch mounted to oscillate, a wheel connected in operative relation with the said torch, a motor in operative relation with the said wheel, whereby the said wheel is normally under stress, a spindle upon which the wheel is mounted, having a relatively short spring-actuated lever, means normally in the path of the said lever to prevent the wheel from rotating, a push button plunger arranged to be actuated to release the spindle arm therefrom and allow the wheel to rotate for actuating the torch, and an arm carried by the spindle and adapted to come into contact with the push button plunger when the same is in the depressed position after the spindle has turned a predetermined distance, for the purpose set forth.

6. A cigar lighter, comprising a torch mounted to oscillate, a wheel rotatably mounted and connected in operative relation with the torch, a motor connected in operative relation with the wheel, a spindle with which the said wheel is connected, an arm on said spindle carrying a short lever at its outer extremity, means normally engaged by the said short lever to prevent the wheel from rotating, a plunger having an exposed push button, arranged when pushed inwardly to actuate the lever to release the arm of the said spindle and allow the wheel to rotate, a second arm carried by the said spindle and projecting therefrom diametrically opposite to the first named arm and arranged to come into contact with the said plunger when the push button is in the depressed position, after the torch has been thrown to the lighted position for limiting the turning movement of the spindle, substantially as described.

7. A cigar lighter, comprising a torch mounted to oscillate, a lever connected in jointed relation with the torch, a wheel rotatably mounted and connected in operative relation with the lever, a spring, a spindle with which one extremity of the spring is connected, a gear with which the other extremity of the spring is connected, an operative relation between the gear and the lever-actuated wheel, means for normally locking the lever-actuated wheel against movement when the torch is in its normal position, and means for locking the lever-actuated wheel to hold the torch in the lighted position, substantially as described.

8. A cigar lighter, comprising a torch mounted to oscillate, a wheel rotatably mounted and connected in operative relation with the torch, a motor in operative relation with the wheel, a spindle with which the said wheel is connected, an arm carried by the said spindle, means normally engaged by the arm to prevent the wheel from rotating, a plunger arranged when pushed inwardly to actuate the arm for releasing the wheel, and a second arm carried by the said spindle and arranged to come into contact with the plunger when the plunger is in the depressed position and after the wheel has completed one half of a revolution and thrown the torch to the lighted position, substantially as described.

In testimony whereof I affix my signature in presence of two witnesses.

DAVID A. THOMAS.

Witnesses:
A. J. O'BRIEN,
A. EBERT O'BRIEN.

---

Copies of this patent may be obtained for five cents each, by addressing the "Commissioner of Patents, Washington, D. C."